United States Patent
Powell et al.

(10) Patent No.: US 7,581,036 B2
(45) Date of Patent: Aug. 25, 2009

(54) OFFLINE CACHING OF CONTROL TRANSACTIONS FOR STORAGE DEVICES

(75) Inventors: Therron L. Powell, Redmond, WA (US); Carl M. Carter-Schwendler, Kirkland, WA (US); David P. Golds, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 554 days.

(21) Appl. No.: 10/964,854

(22) Filed: Oct. 13, 2004

(65) Prior Publication Data

US 2006/0080471 A1 Apr. 13, 2006

(51) Int. Cl.
G06F 3/00 (2006.01)
(52) U.S. Cl. .............................. 710/5; 725/115; 725/134
(58) Field of Classification Search ..................... 710/1, 710/6, 10, 73, 5; 725/46, 115, 134; 386/46
See application file for complete search history.

(56) References Cited

U.S. PATENT DOCUMENTS

| | | | |
|---|---|---|---|
| 5,263,142 A | | 11/1993 | Watkins |
| 5,379,439 A | | 1/1995 | Harrison |
| 5,522,089 A | * | 5/1996 | Kikinis et al. ................. 710/73 |
| 5,528,758 A | * | 6/1996 | Yeh ............................... 710/1 |
| 6,233,389 B1 | * | 5/2001 | Barton et al. ................. 386/46 |
| 6,441,854 B2 | | 8/2002 | Fellegara |
| 6,476,725 B2 | | 11/2002 | Aguren |
| 6,574,678 B1 | * | 6/2003 | Nykanen et al. .............. 710/10 |
| 6,671,757 B1 | * | 12/2003 | Multer et al. ............... 710/100 |
| 6,832,729 B1 | | 12/2004 | Perry |
| 6,862,604 B1 | | 3/2005 | Spencer |

(Continued)

OTHER PUBLICATIONS

Office Action dated Feb. 13, 2007 cited in U.S. Appl. No. 10/965,562.

(Continued)

*Primary Examiner*—Henry W. H. Tsai
*Assistant Examiner*—Elias Mamo
(74) *Attorney, Agent, or Firm*—Workman Nydegger

(57) ABSTRACT

A system and method using hardware and software components enable a storage module to collect and maintain control transaction data (e.g., directives/events) when a storage device of the module is offline or in a low power configuration. The storage module contains a nonvolatile memory cache and a module controller, and also may include a separate power source, an output display and input mechanism so that when offline, the user may display and navigate among catalog information corresponding to stored content to set up deferred events related to the content. When reconnected to a general-computing host system, the host system obtains the control transaction data from the storage module, and processes the data into file-system related events and other events to perform actions to the storage device and/or to other resources coupled to the host computer system. The host system may also cache transaction control data on the storage module's cache.

45 Claims, 8 Drawing Sheets

U.S. PATENT DOCUMENTS

| | | |
|---|---|---|
| 6,917,349 B2 | 7/2005 | McGowan |
| 6,970,318 B2 | 11/2005 | Goodman |
| 7,024,427 B2 | 4/2006 | Bobbitt |
| 7,209,863 B2 | 4/2007 | Fukuda |
| 7,346,472 B1 | 3/2008 | Moskowitz |
| 2002/0010641 A1 | 1/2002 | Stevens |
| 2003/0093792 A1* | 5/2003 | Labeeb et al. ............... 725/46 |
| 2004/0107260 A1* | 6/2004 | Hashiya et al. ............ 709/206 |
| 2004/0224638 A1 | 11/2004 | Fadell |
| 2005/0068547 A1 | 3/2005 | Negishi |
| 2005/0108769 A1* | 5/2005 | Arnold et al. ............. 725/115 |
| 2006/0007576 A1 | 1/2006 | Georgis |
| 2006/0080359 A1 | 4/2006 | Powell |
| 2006/0095647 A1 | 5/2006 | Battaglia |

OTHER PUBLICATIONS

Office Action dated May 30, 2007 cited in U.S. Appl. No. 10/965,562.
Office Action dated Aug. 17, 2007 cited in U.S. Appl. No. 10/965,562.
Office Action dated Feb. 20, 2008 cited in U.S. Appl. No. 10/965,562.
Office Action dated Oct. 15, 2008 cited in U.S. Appl. No. 10/965,562.

* cited by examiner

OFFLINE CACHING OF CONTROL TRANSACTIONS FOR STORAGE DEVICES

CROSS-REFERENCE TO RELATED APPLICATION

The present invention is related to U.S. patent application Ser. No. 10/965,562, entitled "Electronic Labeling for Offline Management of Storage Devices," filed concurrently herewith, the content of which are incorporated herein by reference.

FIELD OF THE INVENTION

The invention relates generally to computer storage devices, and more particularly to working with computer storage devices when in an offline state.

BACKGROUND

At times when a storage device is coupled to and running in a host computer system, that is, while the storage media can be considered in an "online" state, it is relatively easy to manage the stored content, such as via directory and search technologies. However, a significant need to control and manage stored content also exists when in an offline state.

For example, as hard drive costs decrease, users are acquiring new hard drives faster than their existing ones are failing or being retired. However limits on drive cabinetry, power, cabling and controllers means that some of the storage devices need to remain in disconnected states until specifically needed. As a result, there is a need to manage the content of such drives when disconnected.

The need to manage content stored on a disconnected storage device is becoming more important with the rapidly expanding technology of hot-pluggable storage devices for computing systems. This was not a significant issue in the past, where many prior consumer drives interfaced via ATA or IDE standards, which required that such drives be connected or removed from the computer system while the whole system is powered down. Thus, most users did not frequently exchange hard drives in their systems, but rather had tape, CD-ROM and DVD-ROM for maintaining large quantities of swappable content. However, contemporary technologies such as USB, 1394 and SCSI, as well as Serial ATA (SATA), have resulted in portable hard drives, in which ordinary computer consumers may have multiple hard drives that are regularly connected, disconnected and transported.

Indeed, many computer users are now using mechanical hard drives as mobile repositories/portable media used among different computer systems devices. There are many scenarios in which it is faster and/or otherwise preferable to physically transport high-capacity media, instead of transmitting the data. By way of example, one emerging PC-based use for hard drives is as a Personal Video Recorder (PVR). With such technology, hard drives likely will be used in a manner that is similar to how videotape cassettes have been in the past, e.g., by moving the hard drives from one computer/television to another as needed.

In sum, the number of useful and important storage devices owned by computers users will continue to expand, meaning some will have to exist in a disconnected state until needed. The power and time required to connect a storage device's communications interfaces and spin up a drive make it difficult to manage multiple storage repositories, including their configuration, hosted content and control events that need to occur upon reconnection to a host system.

What is needed is an improved scalable and flexible way to manage and control mechanical storage devices, including when the device is offline or in a low power configuration.

SUMMARY OF THE INVENTION

Briefly, the present invention is directed towards a system and method by which control transaction data (e.g., control events/directives) are maintained in association with a storage device, when the storage device is offline or in a low power configuration. To this end, a storage module (e.g., in the form of a cartridge) contains one or more storage devices/storage media, such as a hard disk drive, a nonvolatile module memory cache and a module controller. The control transaction data may be written to the nonvolatile memory when coupled to a host system, or if configured with an autonomous user interface, when decoupled from a host computer system. To this end, the storage module may include a display screen and an input mechanism that allow control events to be entered. For example, the display may present a catalog of a storage device's content, and menus of selectable events (e.g., delete, rename, copy) may be presented to allow a user to associate an event with selected content.

To maintain the information, the storage module contains non-volatile memory, so that, for example, a hard disk drive need not be connected to a host computer system, or if connected, need not be spun up in order to access the information. The storage module may also provides a separate power source such as an internal battery so that the cached control transaction data may be accessed when the storage module is not operating, that is, when the storage module is not connected to a host computer or the storage device is in a powered-down state. A controller component comprising a processor and executable code provides the logic to generate the initial display output and to adjust the output appropriately as the user navigates via the input mechanism.

When the storage module is connected to a host computer system, the controller operates to provide the events and/or other information stored in the storage module's NVRAM to a transaction executor on the host computer system, as well as perform other operations such as update its content catalog. With this architecture, the storage module's NVRAM allows the transaction control data to travel with the storage device. Other useful information such as complex configuration data, security information and logging data may be cached.

The transaction executor processes the cached control events into file-system related events, such as file rename, delete and backup events, and into any other events directed to a resource coupled to the host computer system. Various actions may be taken upon connecting the storage module to the host computer system, such as file system-related events to files, software installation, backups and restores to or from the storage module, and so forth. Events may be scheduled and/or triggered by other means. The set of relevant control events and corresponding actions may be different for different host computer systems, different hard drives, different conditions and/or different users.

Various interconnect technologies are supported for coupling the storage module's storage device and controller to the host operating system's hardware driver support facilities input/output (I/O) and transaction subsystems. In one configuration the module's controller shares a single interconnect between the host operating system components and the storage module. For example, a USB bridge that supports two separately addressable USB devices, namely the catalog controller and a general USB-to-HDA storage controller, is used to separate the control information from the file system I/O data received over a single USB connection. Alternatively, a single SATA (serial ATA) cable couples the host system to the storage module, with a SATA Management Enclosure Bridge (SEMB) used to separate file I/O from SEP_ATTN commands related to the control information. In another alternative configuration, the storage module has discrete and parallel communications paths, comprising one I/O communication path between the host system and the primary storage (e.g., over SATA), and another communication path from the host components to the storage module controller (e.g., over a USB connection).

Other advantages will become apparent from the following detailed description when taken in conjunction with the drawings, in which:

DETAILED DESCRIPTION

Exemplary Operating Environment

Figure 1:
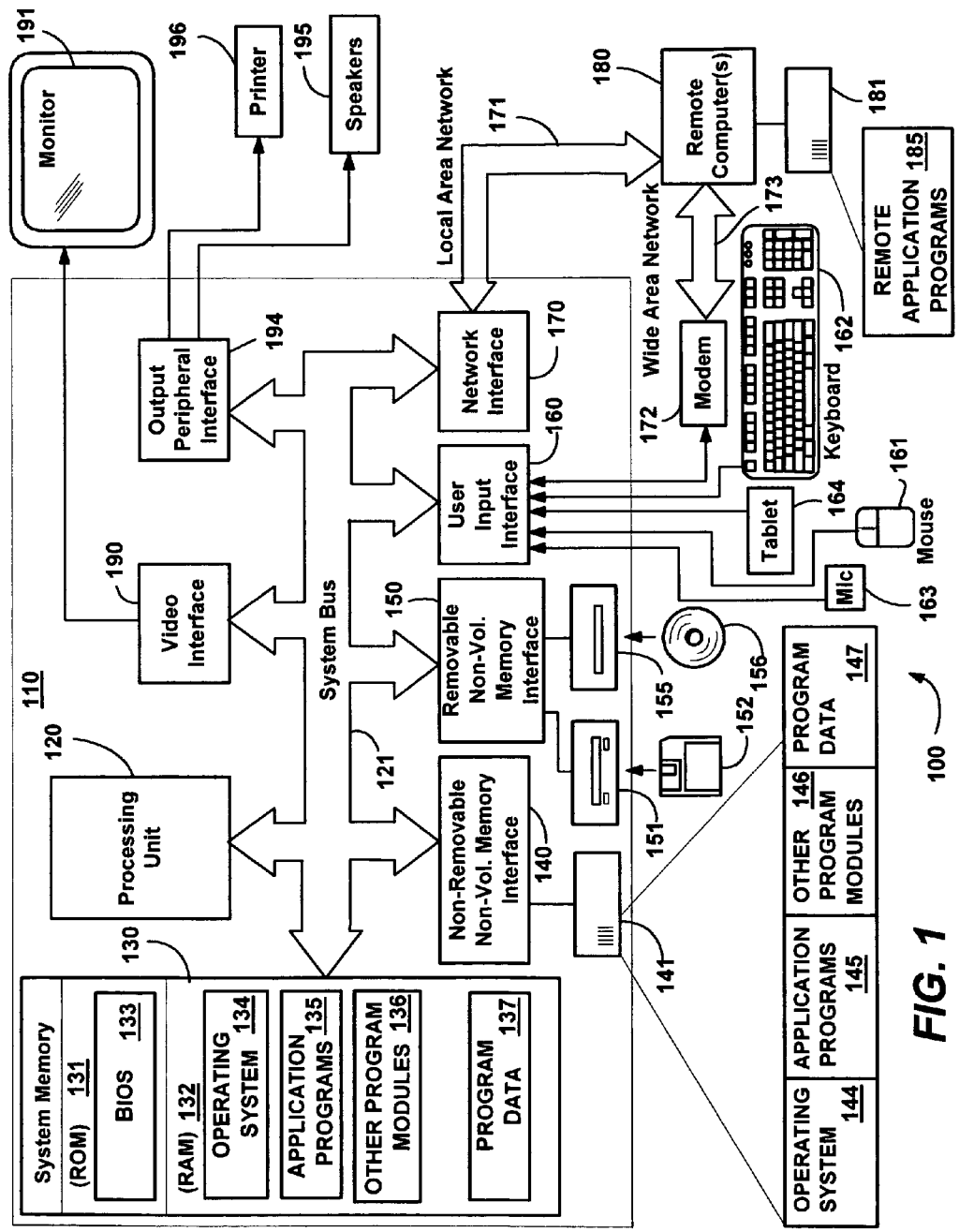
FIG. 1 is a block diagram generally representing a computer system which may host a storage mechanism in accordance with various aspects of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Offline Caching of Control Transactions

The present invention is generally directed towards a system and method by which control transaction data, typically one or more directive events, is maintained in association with a storage device, such that the control transaction data is applied when the storage device is reconnected to an appropriate host computer system. A typical example of control transaction data includes a set of one or more commands to execute when the device is next reconnected to an appropriate host computer system, or upon some other relevant event, such as the storage device's medium being spun up. The control transaction data may be maintained in a way that allows access when the device is offline or in a low power configuration. Thus, an operator may establish and cache control events directives while a storage device is offline, or in a low power or reduced interrupt state, to enable deferred operational transactions to be executed at a more appropriate time such as when the device is reconnected and fully operational.

As will be understood, numerous ways to implement the present invention are feasible, and only some of the alternatives are described herein. For example, the present invention is described below with reference to an example in which a storage module (or cartridge) is organized such that it hosts one or more persistent storage devices, such as mechanical hard drives, nonvolatile (NVRAM) or flash memory, tape cartridge, optical media or even floppy media. Notwithstanding, other types of storage mechanism containment arrangements are feasible. For example, as will be understood, the present invention may also be organized as a physical and/or logical containment mechanism associated with an analog device where digital information-based description and control is desired. Further, the present invention is primarily described with reference to a storage module having a display, input mechanism and power source so that the transaction control data and other information may be accessed when not connected to a host computer system, however as will be understood, this is not necessary to the present invention. As such, the present invention is not limited to any particular examples used herein, but rather may be used various ways that provide benefits and advantages in computing in general.

Figure 2:
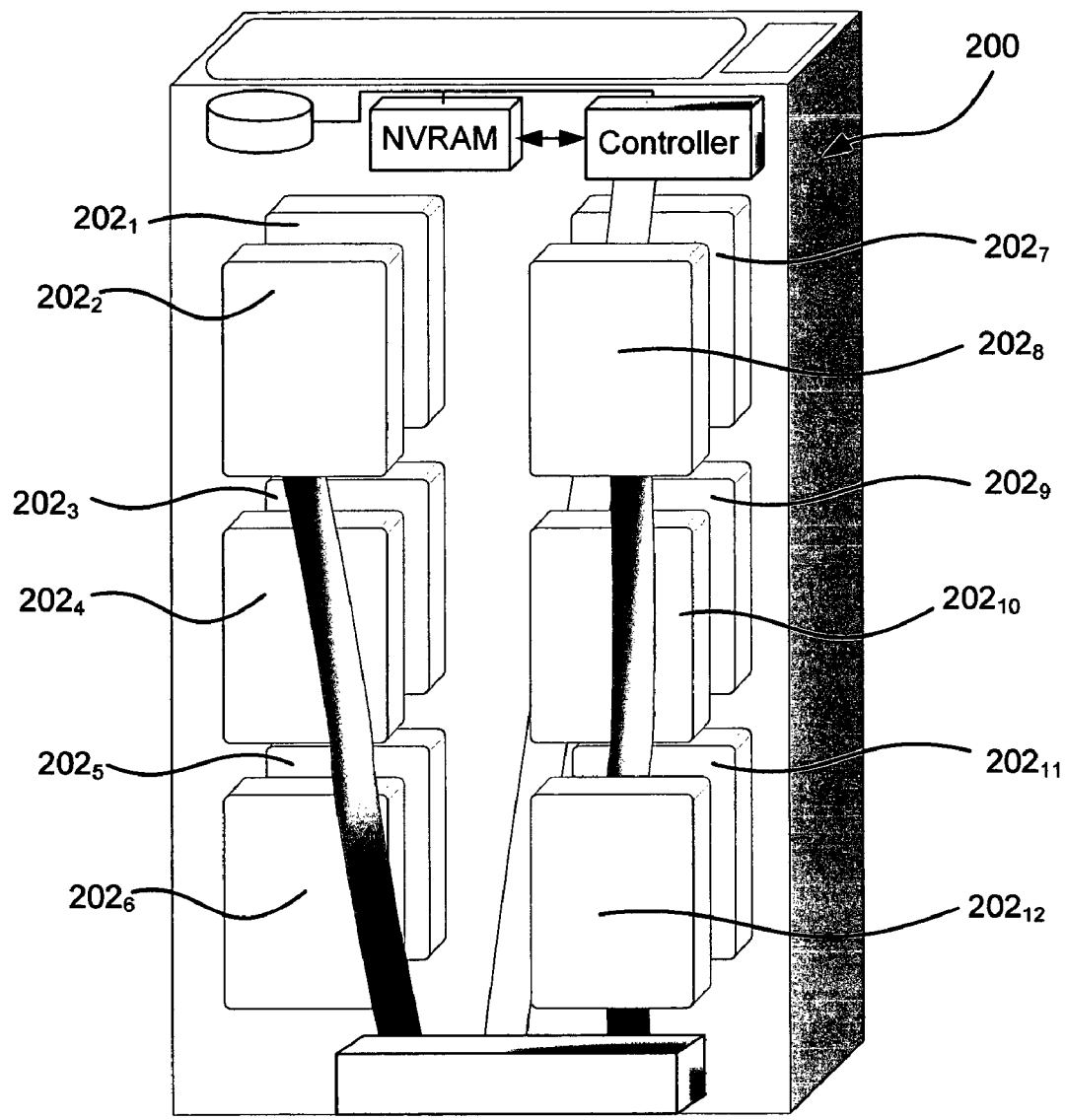
FIG. 2 is a representation of a storage module containing multiple storage devices and including components for providing offline storage information viewing in accordance with various aspects of the present invention.

As represented in FIG. 2, a managed container (e.g., cartridge) 200 may include one or more storage devices $202_1$-$202_{12}$, (although any practical number are feasible), wherein as used herein, the term "storage device" and its variations generally refer to the hardware mechanism (e.g., hard disk, optical drive, tape drive, disk drive and the like) and/or the storage media accessed by the hardware mechanism, (e.g., the platter, optical disk, tape, floppy disk, nonvolatile RAM and so forth). For example, as shown in FIG. 2 a number of hard disks may be contained within a single container 200 such as a set of independent disks, disks combined into a single volume, sets of mirrored disks, and/or disks arranged a RAID set. Note that the container may be separable from the storage device or devices, or contain the hardware mechanism but be separable from the storage media (such as an optical disk), in which event it is the storage device and/or storage media may be interchangeably connected to the container. Alternatively, the container and storage device may be of unitary construction, e.g., a hard disk drive, particularly (but not necessarily) a hot-pluggable one, may have its own permanent container. For purposes of simplicity herein, except where otherwise noted, the present invention will be primarily described with reference to a storage module that includes a container and a storage device comprising a single hard disk drive, regardless of whether the container is separable from the storage device, although it is understood that the present invention will work with optical drives and optical media, tape drives and tape media, and so forth. The storage module 300 may be interchangeably coupled (connected) to and decoupled (disconnected) from a host computer system, such as the computer system 110 of FIG. 1.

Figure 3:
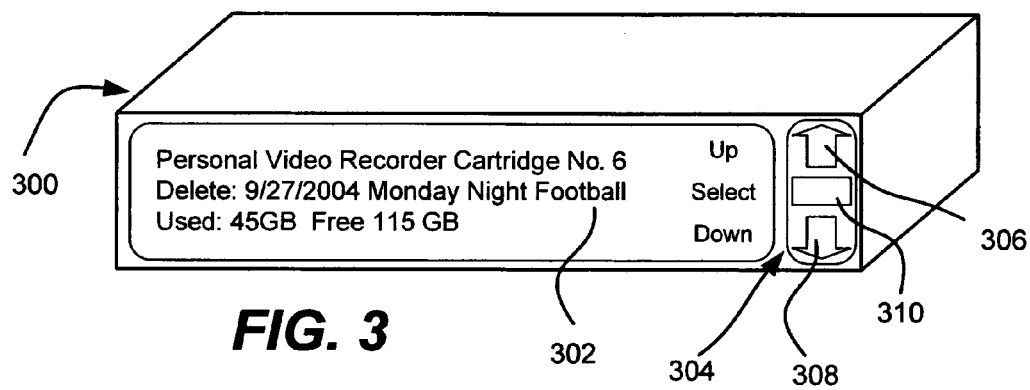
FIG. 3 is a representation of the front of a storage module having a display for providing offline storage information viewing and buttons for interaction, in accordance with various aspects of the present invention.

In accordance with various aspects of the present invention, as represented in FIG. 3, one implementation of the storage module 300 includes an optional display screen 302 that, for example, may be used to output information related to at least some of the content contained in the storage device, and/or other information relevant to the storage device. As can be appreciated, another type of output mechanism, such as a speaker for audio output, may be used instead of or in addition to the display screen. An input mechanism, such as a set of one or more buttons 304 also may be provided, to allow a user to navigate among the displayed information, such as by scrolling. For example, as represented in FIG. 3, an up button 306 and a down button 308 are provided to enable scrolling, along with a select button 310 that allows a selection to be made, e.g., to select a line of highlighted data for further operation thereto, such as when scrolling through a list of titles that correspond to content. Note that not all of the displayed information needs to scroll; for example, a main disk title and/or used and free space information may be continuously presented regardless of where the user scrolls, particularly if more lines of text are available. Graphics may also be displayed.

As can be readily appreciated, as in FIG. 3 the display 302 may be arranged to present a description of the buttons 304, in which event the meaning of the individual buttons and their accompanying description may be changed to match a current operating context. For example, if the display provided menu items in a horizontal row, the set of buttons 304 may represent Left, Select and Right operations. A larger or fewer number of buttons may be present in a given storage module, e.g., a single button could be used to circularly scroll through the information, or left and right buttons may also be provided. Further, the buttons 304 may be used to access other information, such as by using them to navigate a menu, e.g., to find information such as the amount of free space on the storage module.

Figure 4:
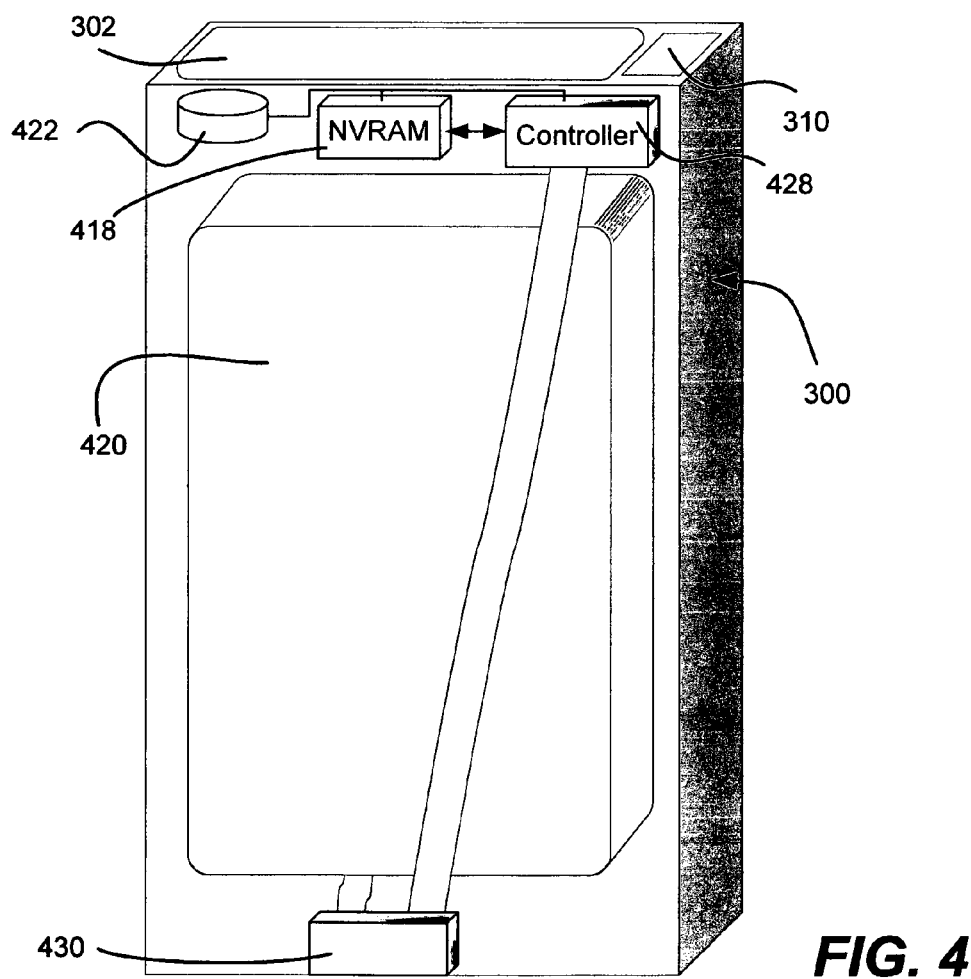
FIG. 4 is a representation of a storage module with the bottom removed to show an example module containing a single storage device and including components for providing offline storage information viewing in accordance with various aspects of the present invention.

In keeping with the present invention, as represented in FIG. 4 (in which the container's bottom is transparent to illustrate the internal components), the storage module 300 contains non-volatile memory 418 (e.g., NAND NVRAM) for storing a cache of control transaction data, as well as, for example, content labeling information. The storage of content labeling information is further described in U.S. patent application attorney docket no. 4580, entitled "Electronic Labeling for Offline Management of Storage Devices," filed concurrently herewith, assigned to the assignee of the present invention and hereby incorporated by reference in its entirety.

The cached information is typically separate from the primary storage medium (e.g. hard drive) 420, so that, for example, the hard disk drive need not be spun up in order to access the control transactions. In other words, the information is maintained in a memory 418 that is accessible even when the primary storage device is non-operational. As a result, the cached information can be accessed while connected but without spinning up the disk. If present, the storage module's display 302 and/or the host computer's display (e.g., the monitor 191 of FIG. 1) may be used to present the information in such a connected but primary storage device powered-down state.

The display 302 and input mechanism (e.g., the buttons 304) provide an interactive interface, which in one implementation may provide a series of menus and/or selection tables by which a user can navigate content, selecting and relating together elements to describe the parameters and conditions that form the control transaction data and/or recurring transaction policy in the memory 418. These control transaction data directives may be stored in a variety of formats in the memory 418, such as represented by multi-valued properties, and/or as a set of transaction description records for the desired operation or recurring transaction policy, e.g., encoded within an XML file or organized within a more generalized script file. The control transaction data set is retained in the memory 418 until the storage module 300 is connected to an appropriate host computer system which retrieves the transaction control data and execute the indicated operations against the storage module and other resources, as described below.

In one implementation, the control transaction data may be collected and other information may be accessed from the NVRAM 418 when the storage module 300 is not connected to a host computer system. In this implementation, the storage module 300 provides the display 302 and input mechanism 304, and includes a separate power source 422 (e.g., an internal battery). To conserve power, the display 302 can be turned off when not in use for a time; one or more of buttons of the button set 304 may be used as a "power-on" button to activate the display screen 302 and power the other components of the storage module 300. Note that contemporary USB hard drives already separately plug into a power source from the computer system's power, and this power source may be used instead of or in addition to a battery. Further, note that physical separation of the NVRAM memory 418 from the primary storage device is not necessary with a nonvolatile-memory-based storage device such as a USB "drive," as such a device may have some portion of its non-volatile memory reserved for preserving the content labeling information.

To generate the initial output on the display and adjust it appropriately as the user navigates via the buttons 304, logic in the form of a controller component 428 executes code. The controller component 428 is shown as a separate component, such as a processor with a ROM, or RAM into which the code is copied/decompressed from the NVRAM 418 for execution, although as can be readily appreciated, the instructions of the controller component 428 may execute in place in a section of the NVRAM 418. An operating system such as Microsft Windows® CE is one possible platform for the controller 428, however to save memory and cost, an alternative is to provide a simple, low-power controller primarily dedicated to display, navigation and handling input, and receiving data from the host computer system when connected. As described below, when connected, such a controller 428 will still provide rich and broad functionality by using the host operating system (e.g., Microsoft Windows® XP), that is, the host operating system will perform much of the complexity needed to keep control transaction information, any content labeling information and any other information current.

The storage module 300 also includes a pluggable interface 430 for interconnection with the host computer system. In addition to being coupled via the pluggable interface 430 to a host system for use as a conventional storage device, the controller 428 also connects to the host system pluggable interface 430, generally for providing control transaction information to the host system, but also for likely other purposes such as for updating any cached content labeling information, upgrading the controller logic, and so forth. Thus, another significant use of the controller 428 may be as a catalog controller that provides the representations of stored content when the storage module is offline. Note that as described below with reference to FIG. 10, the pluggable interface 430 physically may be two separate interfaces, e.g., a USB interface and a SATA interface.

With this architecture, the NVRAM 422 can obtain transaction control data from a user, typically by displaying representation of the content on the storage medium 420 of the storage module 300 and allowing commands or the like to be associated with selected content items. In other implementations, the transaction control data may be provided to the NVRAM 422 by the host computer system. Significantly, regardless of how obtained, the transaction control data travels with the storage module itself.

Figure 5:
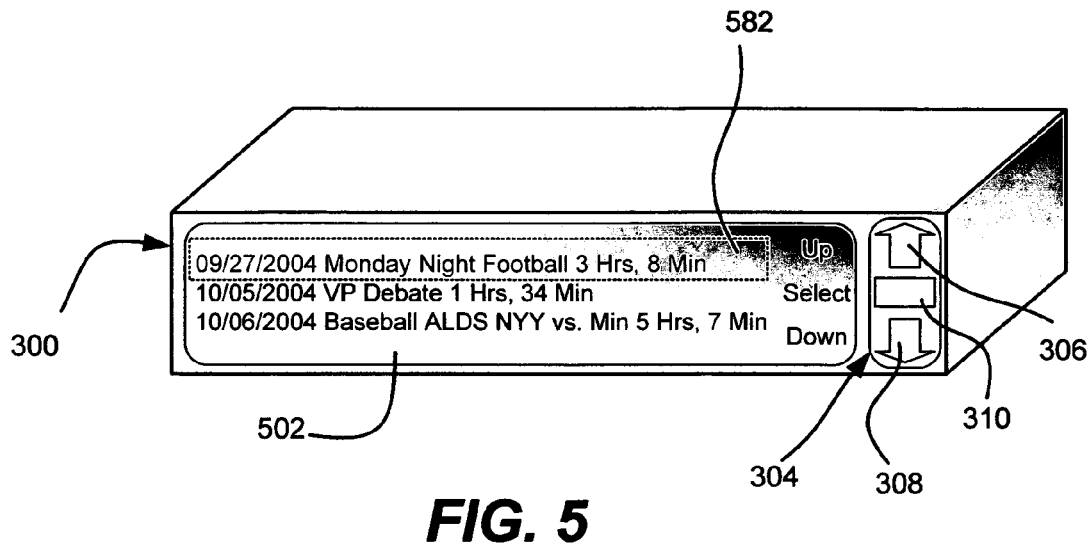
FIGS. 5 and 6 are representations of the front of a storage module having a display for managing control transactions for applying upon reconnection to an appropriate host computer system, in accordance with various aspects of the present invention.
Figure 6:
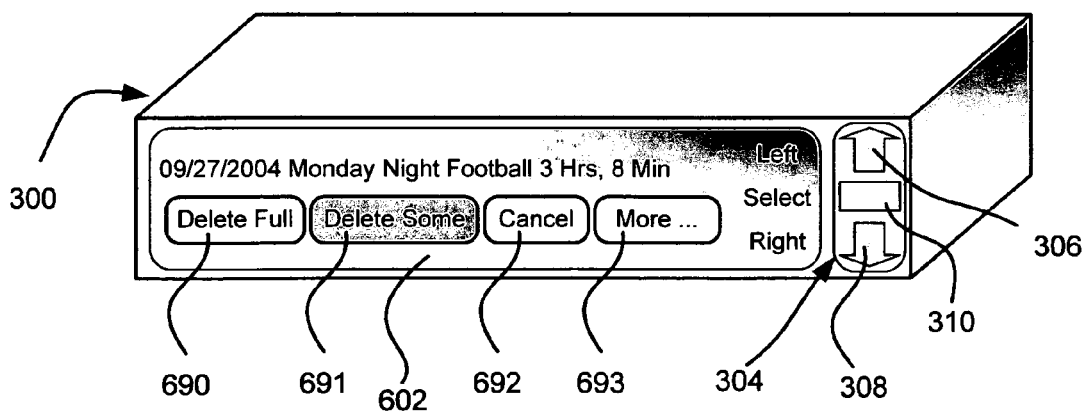

FIGS. 5 and 6 provide example screen shots showing how a user may input transaction control data to the storage module's NVRAM 418 when the storage module 300 is disconnected from a host computer system. In FIG. 5, a user is able to scroll among displayed content item representations on the example screen 502 via the buttons 304. To this end, a highlighting-type cursor 582 or similar indicator (such as differently colored text, an arrow-shaped pointer and so on) indicates which item of content in this example will be selected for further interaction should the user actuate the select button 310. In the example herein, the user does so, and thus the highlighted content item (a recorded television program) is selected for further interaction, as represented in FIG. 6.

In the example of FIG. 6, the user is given menu options 690-693, some of which may correspond to control transactions that a user can cache for later execution by a host system when the storage module 300 is reconnected to it. For example, if selected, option 690 allows a user to delete the entire content item, while option 691 allows a user to delete some of it; for example, a sub-menu might be provided to allow deletion of any range of time within the three hours, eight minutes of recorded video, so as to free up space without erasing the entire item. In this example, the user is also given a "Cancel" option 692 which if selected will take the user to a previous screen without storing a control transaction. A "More . . . " option 693 may give the user other options, such as to copy the item to another storage medium on next reconnect, re-title the content item, and so forth. A warning prompt/confirmation or the like may be given before caching appropriate actions, so as to make sure that the user intended the action, which for example may delete content. Note that in FIG. 6, the set of buttons 304 now represent Left, Select and Right, as reflected on the example display screen 602, to correspond to the horizontally arranged menu items. In such a manner, one or more control transactions associated with one or more content items may be cached for subsequent execution upon reattachment to an appropriate host computer system.

Along with control transaction data, a substantial amount content of information may be cached and made viewable by utilizing the buttons 304 to display and navigate through the information describing hosted content. Other useful information such as configuration data and logging data may be stored. Note that if the storage module is such that its hard drive is separable from the cartridge container and the other module components, then the NVRAM may contain multiple sets of transaction control data, and use an appropriate one based on the drive that is currently inserted, e.g., by using a unique identifier for the drive. Alternative implementations may allow a user to view the cached transaction control data from more than one detachable storage device even when the corresponding storage device is not inserted into the storage module.

Figure 7:
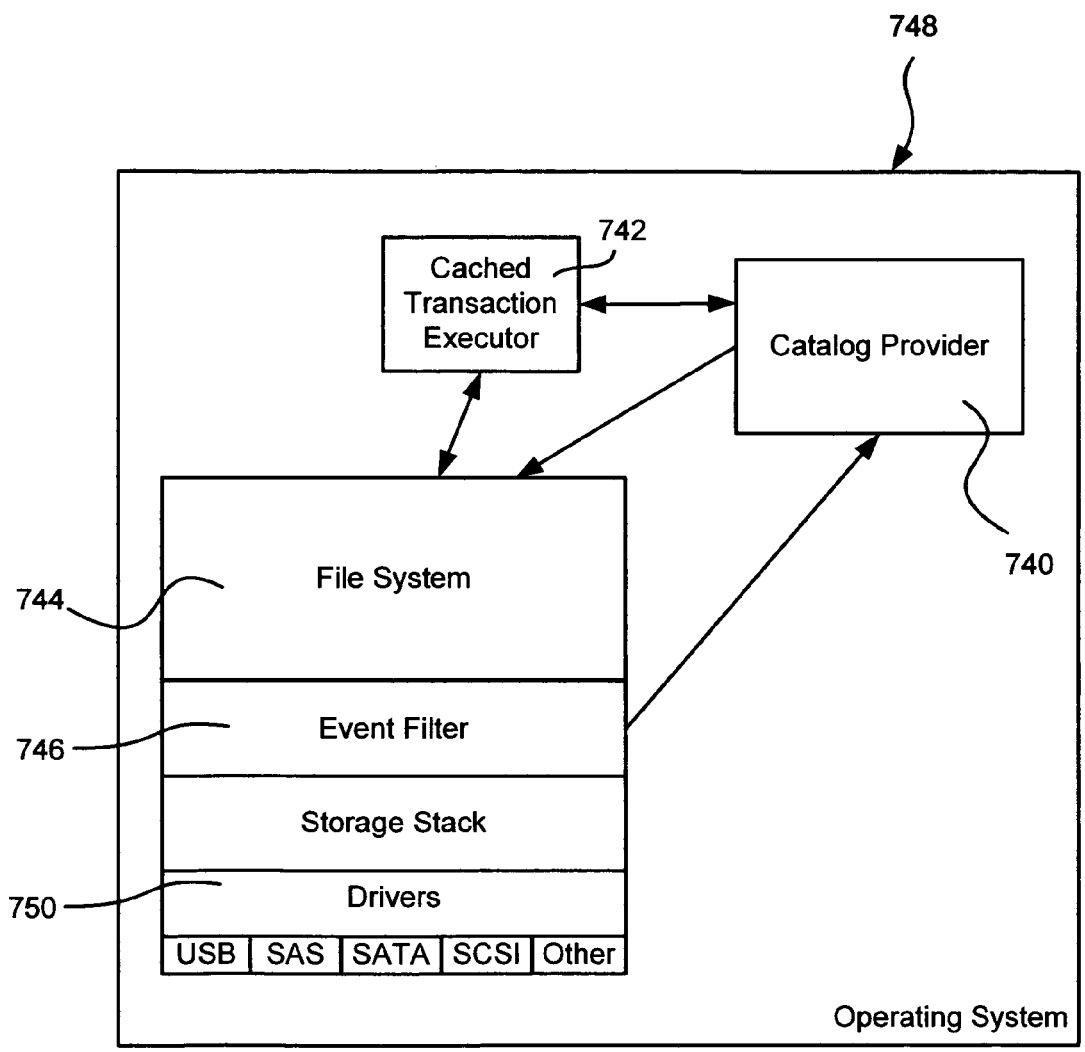
FIG. 7 is a block diagram generally representing components within a personal computer that provide a platform for automatically updating labeling information and/or other information on a connected storage module constructed in accordance with the present invention.

In accordance with another aspect of the present invention, as represented in FIG. 7, some or all of the transaction control data set events may be executed for the user when online. To this end, in an example implementation, a cached transaction executor 742 allows actions to be taken with respect to the file system files and/or possibly other resources. Note that before taking the action, a warning prompt/confirmation may be given, so that, for example, a user can cancel a possibly long-ago requested action. Note that policy may be applied to such decisions, e.g., to maintain the earlier versions of files rather than delete them.

In one implementation, a catalog provider component 740, (which in the aforementioned "Electronic Labeling for Offline Management of Storage Devices" patent application may dynamically update the content labeling of the storage module), communicates with the storage module controller 428 to obtain any control transaction data cached in the NVRAM 418. To this end, the platform takes advantage of the host operating system's hardware driver support facilities 750, I/O and transaction subsystems. The modular driver facility 750 enables diversified controller interconnect technologies (USB, SATA, 1394, SAS, SCSI, iSCSI, CIFS, WebDAV and so forth), without necessarily requiring development of new hardware support drivers. As the storage module is connected to the host system, cached control transaction data (e.g., records) may be obtained by the host software (the catalog provider 740) to take corresponding actions. As a result, beyond the power benefits that are available via offline operation, it is seen that the file system logic, block data interpretation, security infrastructure and so forth already instantiated within a host operating system are leveraged by having the transaction executions performed while the device is connected to a host system. Because the storage module controller 428 need not execute the managed transactions, the storage module 300 need not be overly complex, simplifying the requirements for the cartridge controller 428 and thereby allowing for cost effective parts.

Upon detection of a reattached device, the cached transaction executor 742 (which although shown separately in FIG. 7 may be part of the catalog provider 742) processes cached control transaction data obtained from the NVRAM 418 by the catalog provider 740 into corresponding file system commands such as file I/O requests, and/or into other events. Note that as described in the aforementioned "Electronic Labeling for Offline Management of Storage Devices the catalog provider component 740 also allows application programs and operating system components to register for desired events related to the file system 744, such as file creation, rename, delete and backup events, and to specify correlating content labeling information that is to be written to the NVRAM 418, e.g., as part of a catalog file or the like. Thus, a cached control command may cause a file system related event to transpire, which is automatically trapped by an inline intermediate storage event filter 746 that delivers event information (file name, size, owner and so forth) to the catalog provider 740. A list of such events and corresponding actions may be cached in the operating system, (e.g., by the catalog provider 740), so that the programs that identified the events as relevant to cataloging actions need not be running in order for appropriate action to be taken when such an event is received. Thus, in other words, a cached file system command can change the file system 744, which in turn changes the catalog maintained in the cache from which the command came.

Many such control transactions are possible, beyond the delete, copy and rename type action suggested above. For example, a full, partial or incremental (e.g., changes after a specified date and time) backup may be made to occur from one medium to the newly reconnected storage device, or vice-versa. System backup images may be overwritten, files may be restored, access control privileges may be changed, file metadata may be changed, and so forth. A script file may be run, such as to install software code onto the host a computer system, or schedule an install, whether to the same storage device (e.g., by decompressing files) or to another storage medium. Data for unattended installation from a server also may be cached, e.g., server name, password, configuration parameters and so forth. Control transaction data may configure policy conditions, such as to reschedule a regular backup. Still further, the actions need not be limited to file system operations, but instead, for example, may be commands sent to active application programs or operating system components. The commands may be cached for later use, such as time-triggered or activated when a particular application program is running, or when the hard drive is next spun up for another purpose. Note that a user can also enter control transaction data when the hard drive is connected.

Moreover, it can be readily appreciated that the set of transaction control data and corresponding actions can be different for different hard drives, different host computers, and/or also for different users. In other words, transactions may be general or specific to execution on particular machines, some may describe events to be executed against another storage device, whether any one in general or a specific one, and so forth. For example, when connected to one host computer, a backup may be performed, while when connected to another host computer, the backup file may be copied to a different storage medium on the hard drive; when connected to a third host computer, nothing may happen. Similarly, when one user is logged in, one set of actions may occur, (which may be no action at all), while a different user will receive a different set of actions. The actions may be conditional, such as to copy a set of files only if a sufficient amount of disk space is present on some destination medium. A control transaction data set or part thereof may conditionally be deleted upon completion, or rescheduled for recurring operation. Activity logs may be maintained to aid in management of such operations.

Figure 8:
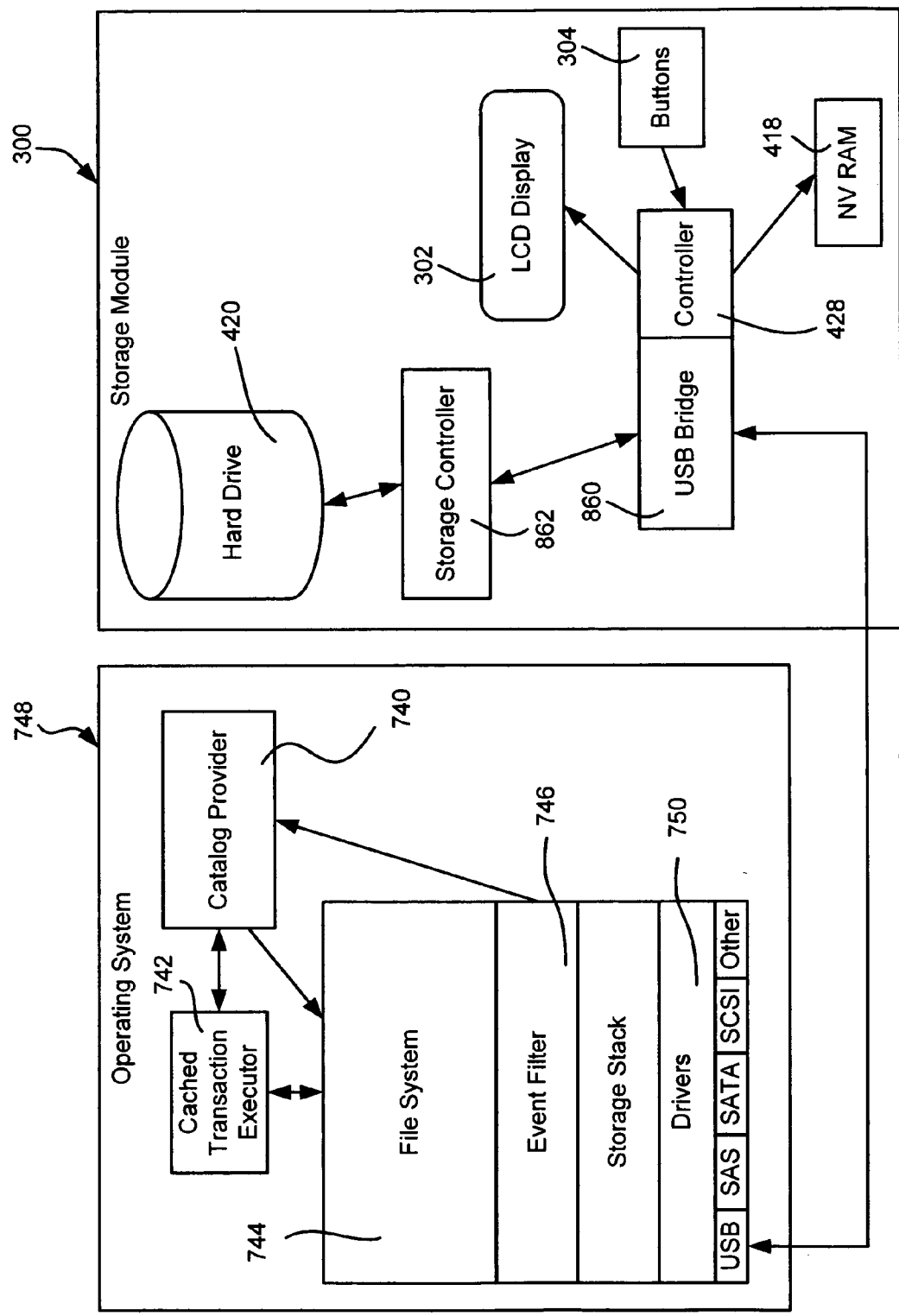
FIG. 8 is a block diagram generally representing components within a personal computer and a storage module constructed in accordance with the present invention, connected over a single USB connection to communicate input/output (I/O) data with the storage module's hard drive and to automatically update labeling information and/or other information on the storage module.
Figure 9:
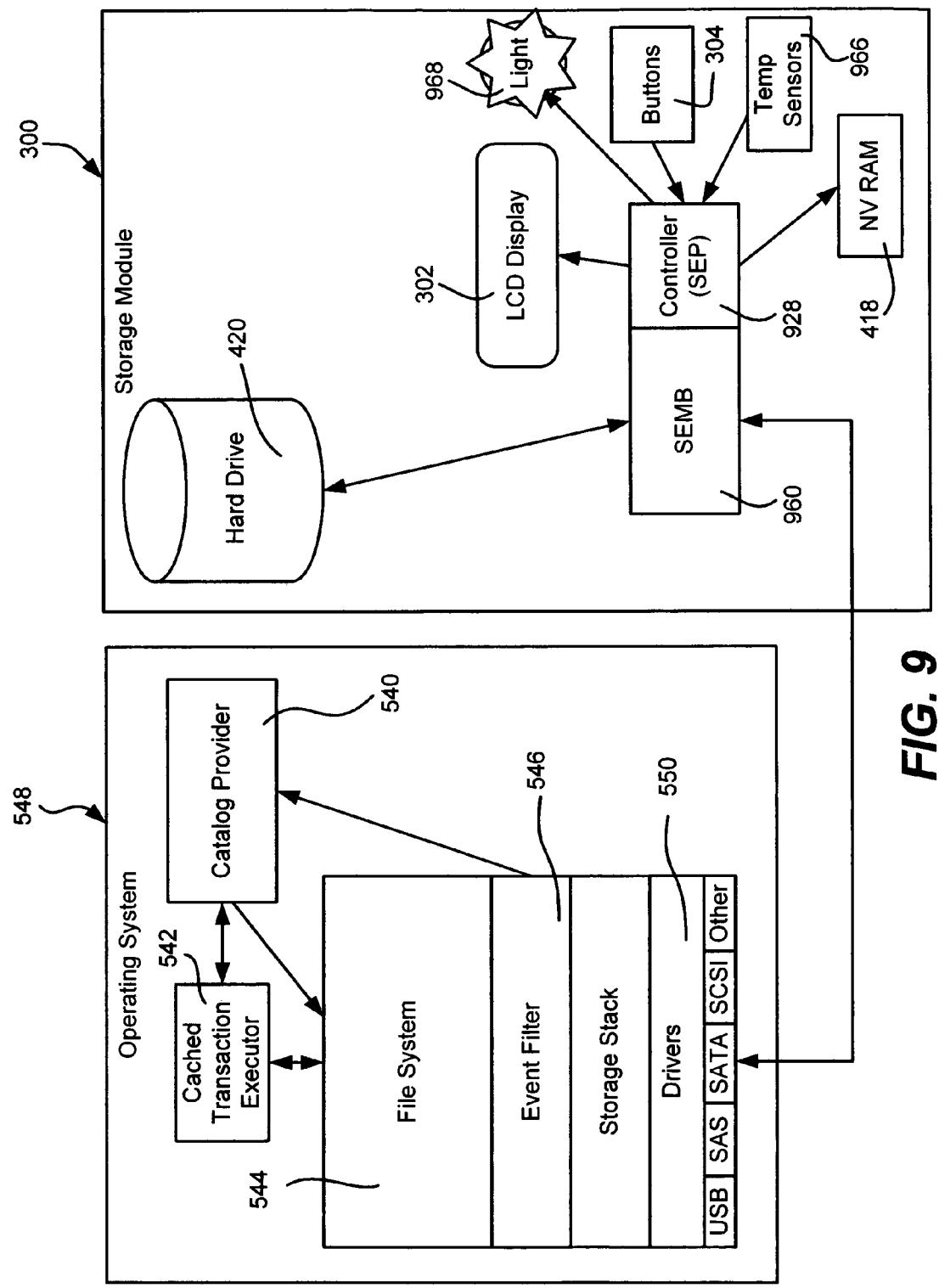
FIG. 9 is a block diagram generally representing components within a personal computer and a storage module constructed in accordance with the present invention, connected over a single serial ATA (SATA) connection to communicate I/O data with the storage module's hard drive and to automatically update labeling information and/or other information on the storage module.
Figure 10:
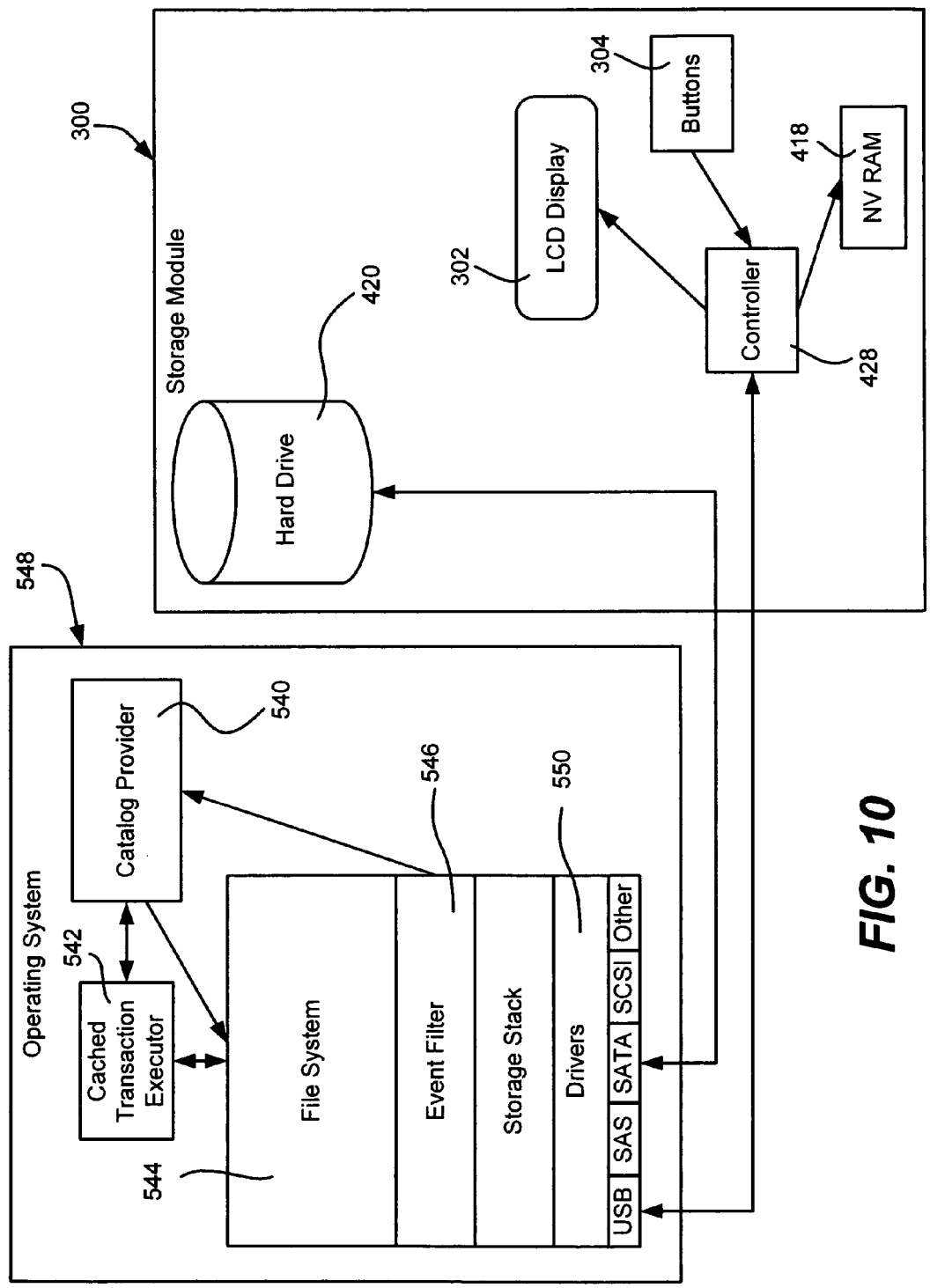
FIG. 10 is a block diagram generally representing components within a personal computer and a storage module constructed in accordance with the present invention, connected over a serial ATA (SATA) connection to communicate I/O data with the storage module's hard drive and connected in parallel over a USB connection to automatically update labeling information and/or other information on the storage module.

As represented in the alternative implementations of FIGS. 8-10, the catalog provider 740 and cached transaction executor 742 process the control transaction data into commands, performs the commands as appropriate, and sends data such as transaction records to the storage module's controller (e.g., 428 of FIG. 4) so that the controller may remove them as having been performed. The records may be sent as soon as ready, or may be batched with other records. When received at the storage module 300, the records are processed so that control transaction data is removed from or modified in the non-volatile memory 418. Note that as described below, control transaction data may be added by the host system to the non-volatile memory 418, for use in a subsequent connection to the same host computer or to a different host computer.

In the example configuration generally represented in FIG. 8, the module controller 428 connects to the host through the primary storage interface, sharing a single interconnect between the host operating system components and the storage module 300. In the example of FIG. 8, the storage module 300 includes a USB bridge 860 that supports two separately addressable USB devices, namely the controller 428, and a general USB-to-HDA storage controller 862. In this manner, file system I/O is communicated to and from the storage controller 862 and the cataloging (or other) information is communicated to and from the controller 428. Note that the file system I/O may correspond to a command that originated via the control transaction data in the cache 418, e.g., the delete command is copied to the cached transaction executor 742, which processes it into an actual file system I/O request, which in turn is sent as a delete command (IRP) to the hard drive 420. If successful, the cache 418 is then updated to reflect the deletion, such as to remove it from the set of control transaction data, and also to update the catalog since the deleted file is no longer present.

Such an inline approach may be accomplished over a variety of alternative interconnects. In one example configuration generally represented in FIG. 9, a single SATA cable couples the host system that runs the operating system 748 and the storage module 300. Within the storage module 300 the controller 928 implements a SATA Management Enclosure Bridge (SEMB) 960 and utilizes storage enclosure processor (SEP) standards. The catalog provider 740 communicates with the controller 928, tunneling through SEP_ATTN commands over the shared SATA interconnect. This kind of controller 928 augments conventional storage enclosure processor functions such as temperature monitors/sensors 966, alarms, technician lights 968 and latch controls.

In another alternative example configuration, the overall system interacts as shown in FIG. 10, with the controller 428 using discrete and parallel communications paths relative to the primary storage 420. In this example, FIG. 10 shows the catalog provider 740 communicating with the controller 428 over a USB connection, while general file I/O to and from the hard drive 420 uses the native SATA facilities. The various functionality thus may utilize the host USB facilities and not necessarily require its own hardware support facilities.

When connected in the online state, the storage module's display 302 may support other information and functionality for the host system. For example, the storage module 300 may be a distribution or installation vehicle for installing software and data to appliances and personal computers. As is understood, the ability to maintain a persistent cache of commands means that commands can be executed when connected to a host system regardless of the skill level of the individual that connected the storage module, ensuring a proper installation experience.

In accordance with another aspect of the present invention, the storage module 300 may also enable functionality while connected online that is not available offline. For example, even without a user interface on the storage module, the host computer system can store control transaction data for use upon a subsequent reconnect to another computer, and/or for use in association with another triggering event. The online system may cache script files for execution on a target machine when locally reconnected to the local agent. Because of the platform, the present invention is able to take advantage of the many of the rich technologies provided in the host operating system (e.g., Windows®) code base, such as to make it easier to leverage services Windows® identity and cryptography infrastructure to ensure that the data on the storage module 300 is inaccessible to unauthorized users. The controller 428 may maintain and control an encrypted and permissioned content store with secretly maintained keys and encrypted NVRAM control files, and also may enforce security. For example, the controller 428 may require an identifier/password be entered to enter and/or execute the cached commands, and even distinguish between multiple users, so that a user sees a display of only the user's cached commands, and does not see data from another user's set. Certain users may be able to view commands information for one class of data (e.g., configuration information) but not another (e.g., backup information). The controller 428 may also function as a trusted agent and/or surrogate facility with respect to the host operating system 748, enforcing secure and secret storage for certificates, licenses and other privileged data cached in the NVRAM 418.

In implementations that have the display panel 302 and control buttons 304, when the storage module 300 is removed from the host system, the drive's primary interconnect (e.g., SATA) becomes non-functional. However, in keeping with the present invention and as described above, because of the independent power source 422 and the included controller 428, the user is able to utilize the display panel 302 and control buttons 304 in such an offline state to enter control transaction data for later use. Thus, for example, a user can select from among storage modules such as maintained in a personal or corporate library, and set up commands to occur when a host computer system is not accessible, such as when traveling, or when no bay is available for inserting the storage module.

As can be seen from the foregoing detailed description, there is provided a method and system that provide an improved, scalable and flexible way to manage and control mechanical storage devices, including when the device is offline or in a low power configuration, by caching transaction control data for deferred execution. The transaction control data is able to be set up in various ways, including when the device is offline or in a low power configuration, thereby providing numerous benefits in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method of executing a control event directive for a storage device in an offline, low power, or reduced interrupt state by caching control transaction data corresponding to the control event directive and deferring execution thereof until the device is fully operational, the method comprising:

receiving, a control event for performing a function on a primary storage medium directly from a user, wherein the control event is received at the storage module when the primary storage medium is in a non-operational state and the storage module is selectively detached from a host computer system, and the storage module is configured such that an operational state of the primary storage medium of the storage module is received from the host computer system that is detachable from the storage module, wherein the operational state is received independent of the control event;

when the primary storage medium is in the non-operational state and selectively detached from the host computer system, storing the control transaction data set comprising the control event in a memory of the storage module that is separate from the primary storage medium in order to delay execution of directives for the control event until the operational state of the primary storage medium;

upon identifying the operational state of the primary storage medium, which is caused by at least selectively attaching the storage module to the host computer system, applying the control transaction data set by the storage module that provides the control transaction data set to the host computer system that is selectively detachable from the storage module; and at the storage module, and after providing the control transaction data set to the host computer system, executing the directives of the control event by performing the function on the primary storage medium now in the operational state, which directives are executed at the storage module by the host computer system.

2. The method of claim 1 wherein applying the control transaction data set comprises generating a file (I/O) request that is directed to the primary storage medium.

3. The method of claim 1 further comprising receiving at least part of the control transaction data set when the storage module is decoupled from the host computer system.

4. The method of claim 3 further comprising providing a user interface coupled to the storage module that is operational when the storage module is decoupled from the host computer system, and wherein receiving at least part of the control transaction data set comprises detecting interaction with the user interface.

5. The method of claim 4 wherein the user interface includes a display, and further comprising, presenting data on the display that is representative of the control event stored in the memory.

6. The method of claim 4 wherein the user interface includes a display, and further comprising, presenting labeling data on the display that is representative of at least some of the content stored on the storage device.

7. The method of claim 1 wherein applying the control transaction data set comprises deleting at least one file from the primary storage medium.

8. The method of claim 1 wherein applying the control transaction data set comprises backing up data from a data source to the primary storage medium.

9. The method of claim 1 wherein applying the control transaction data set to the storage device comprises backing up data from the primary storage medium to a data destination.

10. The method of claim 1 wherein applying the control transaction data set comprises copying a file from the primary storage medium to a data destination.

11. The method of claim 1 wherein applying the control transaction data set comprises scheduling an event.

12. The method of claim 1 wherein applying the control transaction data set comprises installing a software program from data on the primary storage medium.

13. The method of claim 1 wherein applying the control transaction data set comprises downloading and initiating a script onto the host computer system.

14. The method of claim 1 wherein the storage module is coupled to a host computer system, and further comprising, receiving at least part of the control transaction data set from the host computer system.

15. One or more computer-readable media having computer-executable instructions which when executed perform the method of claim 1.

16. In a computing environment, a system for executing a control event directive for a storage device in an offline, low power, or reduced interrupt state by storing control transaction data corresponding to the control event directive and deferring execution thereof until the device is fully operational, the system comprising:
   a host computer system; and
   a storage module that selectively and removably couples to the host computer system, the storage module including
      a storage device having an operational state and a non-operational state, wherein the operational and non-operational states are selectively provided by the host computer that is selectively and removably coupleable to the storage device;
      a memory that comprises a control transaction data set of at least one cached control event configured to execute one or more directives on the storage device, the memory configured to receive and store the control transactional data set when the storage device is in the non-operational state such that execution of the one or more directives is delayed until the operational state of the storage device, wherein the operational state is independent of the control transaction data set; and
      a controller coupled to the memory for outputting data corresponding to the control transaction data set to the host computer system when the storage module is coupled to the host computer system and the controller is enabled to receive the control transaction data set directly from a user as input on the storage module, such that the one or more directives are then applied to the storage device in accordance with the cached control event by the host computer system and without the controller managing the one or more directives.

17. The system of claim 16 further comprising a user interface that is operational to receive at least one command that corresponds to a control event when the storage module is decoupled from a host computer system.

18. The system of claim 17 wherein the storage module includes a power source for powering the user interface and the controller when the storage module is decoupled from a host computer system.

19. The system of claim 17 wherein the user interface comprises a display and an input mechanism.

20. The system of claim 17 wherein the user interface includes a display that presents data representative of at least one control event stored in the memory.

21. The system of claim 17 wherein the user interface includes a display that presents labeling data representative of at least some of the content stored on the storage device.

22. The system of claim 16 wherein the storage module is hot-pluggable into a host computer system.

23. The system of claim 16 wherein the storage module couples to a host computer system via a single communications link that handles input/output I/O communications to the storage device and control transaction data set communications to the controller, and wherein the storage module includes a bridge that separates the I/O communications from the control transaction data set communications.

24. The system of claim 16 wherein the storage module couples to a host computer system via at least two distinct communications links, including at least one communications link that handles input/output (I/O) communications to and from the storage device and another communications link that handles control transaction data set communications from the controller.

25. At least one computer-readable storage medium having computer-executable instructions, which when executed perform a method of executing a control event directive for a storage device in an offline, low power, or reduced interrupt state by storing control transaction data corresponding to the control event directive and deferring execution thereof until the device is fully operational, the method comprising:
   receiving, a control transaction data set comprising a control event to apply to the storage device and which control event is received directly from a user at the storage device, the control transaction data set being received when the storage device is in a non-operational state and the storage device is selectively detached from a host computer system, which host computer system can power a primary storage medium of the storage device;
   storing the control transaction data set in a memory of the storage device while the storage device is selectively detached from the host computer, which control transaction data is accessible independent of whether the storage device is coupled to the host computer system and independent of the primary storage medium, the control transaction data set stored in order to delay execution of the control event until the storage device becomes operational and the primary storage medium is powered by the host computer system, and the operational state of the storage device being controlled by the host computer system independent of the control transaction data set;
   detecting when the storage device is operational as a result of coupling the storage device to the host computer system, and when so coupled, accessing the control transaction data set in the memory; and
   in response to detecting that the storage device is operational, outputting data corresponding to the control transaction data set to the host computer system, which host computer system then executes the control event on the now operational storage device such that execution of the control event is managed by the host computer system rather than the storage device.

26. The computer-readable storage medium of claim 25 wherein receiving the control transaction data set comprises receiving a command on a user interface that is operational independent of whether the storage device is coupled to a computer system.

27. The computer-readable storage medium of claim 26 wherein the user interface includes a display, and further comprising, presenting data representative of at least one selectable control event.

28. The computer-readable storage medium of claim 26 wherein the user interface includes a display, and further comprising, presenting labeling data representative of at least some of the content stored on the storage device.

29. The computer-readable storage medium of claim 25 wherein receiving a control transaction data set comprises receiving at least one control event from a host computer system.

30. The computer-readable storage medium of claim 25 wherein outputting the data corresponding the control transaction data set results in deleting at least one file from the storage device.

31. The computer-readable storage medium of claim 25 wherein outputting the data corresponding the control transaction data set results in backing up data from a data source to the storage device.

32. The computer-readable storage medium of claim 25 wherein outputting the data corresponding the control transaction data set results in backing up data from the storage device to a data destination.

33. The computer-readable storage medium of claim 25 wherein outputting the data corresponding the control transaction data set results in copying a file from the storage device to a data destination.

34. The computer-readable storage medium of claim 25 wherein outputting the data corresponding the control transaction data set results in scheduling an event.

35. The computer-readable storage medium of claim 25 wherein outputting the data corresponding the control transaction data set results in installing an application from data on the storage device.

36. The computer-readable storage medium of claim 25 wherein outputting the data corresponding the control transaction data set results in downloading and initiating a script onto the host computer system.

37. The computer-readable storage medium of claim 25 wherein detecting when the storage device is coupled to a suitable host computer system comprises evaluating an identifier of the host computer system.

38. The computer-readable storage medium of claim 25 wherein detecting when the storage device is coupled to a suitable host computer system comprises evaluating current user information of the host computer system.

39. In a computing environment, a system for executing a control event directive for a storage device in an offline, low power, or reduced interrupt state by storing control transaction data corresponding to the control event directive and deferring execution thereof until the device is fully operational, the system comprising:

a personal video recorder configurable to store video content and to detach from a host computer system, wherein the video recorder comprises:

a storage device used to store the video content, the storage device including at least one hard drive which is spun-up to provide an operational state for the storage device, wherein said operational state results from spinning-up the at least one hard drive as directed by the host computer system;

a memory that is separate from the storage device, and that comprises control event-related information, the memory being used for delaying execution of directives associated with the control-related information until the storage device is operational and the hard drive is spun-up as directed by the host computer system, wherein the control event-related information is provided to the host computer system upon the storage device entering the operational state;

a controller coupled to the memory and configured to provide selection of the control event-related information during the non-operational state of the storage device and directly from a user of the storage device while the storage device is detached from the host computer, wherein the controller does not manage execution of the directives associated with the control-related information;

a connection for selectively and directly coupling the personal video recorder to the host computer system for placing the storage device in an operational state, wherein the connection includes one or both of a Universal Serial Bus (USB) and a Serial Advanced Technology Attachment (SATA) connection directly to the host computer system;

a user interface coupled to the controller, the user interface comprising an input mechanism and a display used for selecting the control event-related information locally on the personal video recorder; and a power source that powers the user interface and the controller to enable access to the memory and control of the user interface for selection and entry of the control event-related information when the personal video recorder is not coupled to the host computer system and the storage device is in the non-operational state.

40. The system of claim 39 wherein the memory, controller, interface and a user interface are incorporated into a cartridge that couples with the storage device.

41. The system of claim 40 wherein the power source is incorporated into the cartridge.

42. The system of claim 39 wherein the storage device comprises a media reader having one or more removable media loaded therein.

43. The system of claim 39 wherein the display presents data representative of at least one control event.

44. The system of claim 39 wherein the display presents labeling data representative of at least some of the content stored on the storage device.

45. The system of claim 39 wherein the input mechanism provides a command to the controller, and wherein the controller configures the control transaction data set in response to the command.

* * * * *